United States Patent Office 3,506,657
Patented Apr. 14, 1970

3,506,657
6,6'-SUBSTITUTED 3,3'-DISULFO-4,4'-DINITRO-
AND 3,3'-DISULFO-4,4'-DIAMINO-STILBENE
Heinrich Hausermann, Riehen, Switzerland, assignor to
J. R. Geigy A.G., Basel, Switzerland
No Drawing. Continuation-in-part of application Ser. No.
419,566, Dec. 18, 1964. This application May 13, 1968,
Ser. No. 728,782
Claims priority, application Switzerland, Dec. 20, 1963,
15,713/63
Int. Cl. C09b 23/14
U.S. Cl. 260—240                                    8 Claims

ABSTRACT OF THE DISCLOSURE 3,3'-disulfo-4,4'-dinitro- and 3,3'-disulfo-4,4'-diamino-stilbenes are described which bear in 6- and 6'-positions alkyl sulfonyl or sulfamoyl groups, and which are useful as key intermediates in the production of novel optical brighteners of the stilbene series. The new 4,4'-dinitro derivatives are also useful as wood stains and wood protecting agents, while the 4,4'-amino derivatives are useful as fluorescent stains in ultraviolet microscopy and as indicators in the analysis of fibers and other organic materials bearing free acid or basic groups.

This application is a continuation-in-part of my pending patent application Ser. No. 419,566 filed on Dec. 18, 1964 now U.S. Patent 3,394,173.

DETAILED DISCLOSURE

This invention relates to novel 3,3'-disulfo-4,4'-dinitro- and 3,3'-disulfo-4,4'-diamino-stilbenes bearing certain substituents in 6- and 6'-positions, and to a novel process for their production.

3,3'-disulfo - 4,4' - dinitro- and -4,4'-diamino-stilbenes which are free from other substituents at the benzene nuclei of the stilbene nuclei are well-known intermediates in the production of optical brighteners of the stilbene series.

However, 3,3'-disulfo-4,4'-dinitro- and 3,3'-disulfo-4,4'-diamino-stilbenes which bear in the 6- and 6'-positions alkysulfonyl or sulfamoyl groups could not be produced in the past. In a first aspect, the present invention provides a novel process for producing such new stilbene derivatives. The following reaction diagram illustrates the novel process up to the production of the 4,4'-dinitro compounds (Formula I in the Reaction Diagram), the step of reducing the latter to the corresponding diamino compounds (Formula II in the Reaction Diagram), and finally also the step of acylating the latter in order to obtain novel optical brighteners (Formula III in the Reaction Diagram) of outstanding properties from the aforesaid dinitro- and diamino-stilbenes (X in the Reaction Diagram has the meanings given further below).

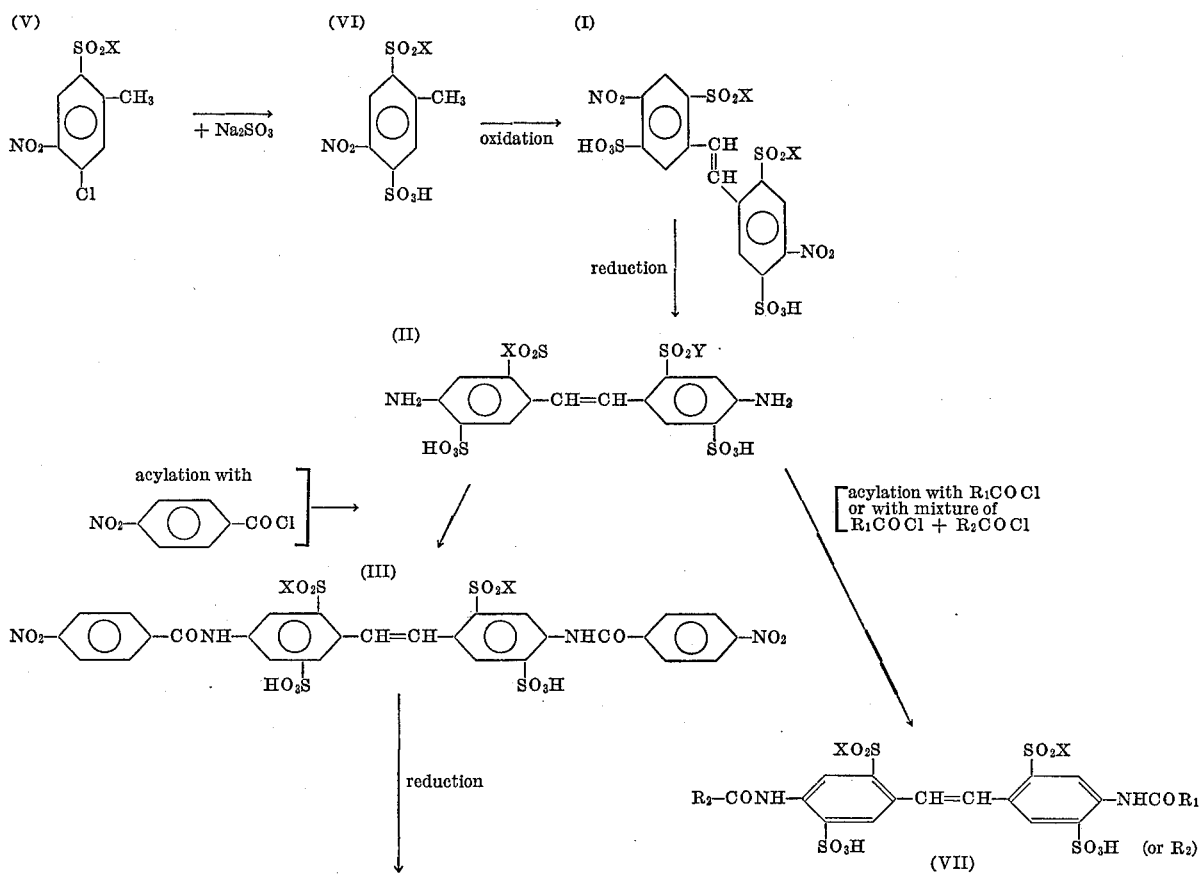

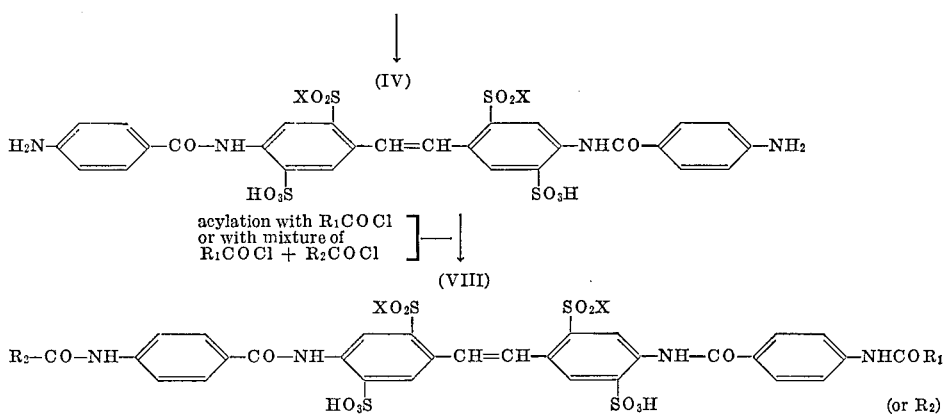

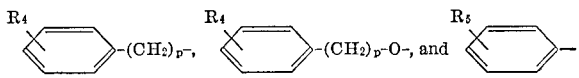

R₁ and R₂ each representing an unsubstituted or non-chromogenically substituted hydrocarbon radical.

By "non-chromogenic substituents" are meant substituent groups which do not impart color to the brightener molecule.

More in particular, each of $R_1$ and $R_2$ represent different or, preferably, identical radicals selected from the group consisting of (lower alkyl)-,
(lower alkoxy)-,
$R_3$-(lower alkyl)-,
$R_3$-(alkoxy)-, wherein the alkoxy moiety has from 2 to 4 carbon atoms, $$\underset{R_4}{\bigcirc}-(CH_2)_p-, \quad \underset{R_4}{\bigcirc}-(CH_2)_p-O-, \text{ and } \underset{R_5}{\bigcirc}-$$

wherein:

$R_3$ represents hydroxy, lower alkoxy, hydroxy-lower alkoxy, phenoxy, chlorophenoxy, bromophenoxy, lower alkyl-phenoxy or lower alkoxy-phenoxy, $R_4$ represents hydrogen, fluorine, chlorine, bromine, lower alkyl, lower alkoxy, hydroxy-lower alkoxy, lower alkoxy-lower alkoxy, $p$ represents 1 or 2, and $R_5$ represents hydrogen, fluorine, chlorine, bromine, lower alkyl, lower alkoxy, hydroxy-lower alkoxy or lower alkoxy-lower alkoxy.

Lower used in connection with "alkyl" and the like aliphatic radicals means that these radicals have from 1 to 4 carbon atoms.

The new dinitro- and diamino-stilbenes of Formulas I and II in which formulas, as well as in the preceding ones, X represents alkyl of from 1 to 5 carbon atoms, and preferably methyl or ethyl; lower alkoxy-lower alkyl, e.g. β-methoxy- or ethoxy-ethyl or γ-methoxy-propyl;

Alkyl of from 1 to 2 carbon atoms substituted by a phenyl radical any substituent of which is selected from chlorine, bromine, lower alkyl and lower alkoxy, di-lower alkylamino; pyrrolidino; piperidino; morpholino;

Lower alkyl-morpholino or hexamethyleneimino, are thus useful as intermediates in the production of the valuable new optical brighteners of Formulas VII and VIII which are described in detail in my application No. 419,566, supra, now Patent No. 3,394,173 of which the present application is a divisional application.

Moreover, the new dinitro-stilbenes of Formula I are useful as wood stains and wood protecting agents. Wood impregnated with these dinitro compounds in concentrations of from about 0.01% to 5% calculated on the dry weight of the wood, is stained a pleasant yellowish to brownish shade dependent on the intrinsic white or yellowish tint of the unstained wood. Furthermore, impregnation of the wood in this manner helps to protect the same against attack by molds and the like wood-destroying fungi, other micro-organisms and wood-devouring insects.

On the other hand, the new diamino-stilbenes of Formula II are useful as fluorescent stains, e.g. for cellulosic objects, to be observed in ultraviolet microscopy. They are also useful as fluorescent indicators for detecting the presence of free acid or basic groups in organic substances and especially in organic polymeric fiber materials.

The new dinitro-stilbenes of Formula III and the new diamino-stilbenes of Formula IV are useful in the production of optical brighteners of Formula VIII.

The new dinitro-stilbenes of Formula I are applied to wood by painting or spraying the wood with a low boiling petroleum fraction (e.g. boiling range 400 to 650° F.) containing, e.g., about 5% of the stilbene or by dipping wood either at atmospheric pressure or under pressure above atmospheric into the above impregnating agent.

Various standards for the treatment of wood by the aforesaid methods of impregnation, etc. have been set up by the Am. Wood Preservers Association. A typical treatment involves impregnation of the wood with the preserving agent under pressure at temperatures in the range of 175–230° F.

According to the process of the invention, the 4,4′-diamino - 6,6′ - (di - alkyl - sulfonyl) - stilbene - 3,3′-disulfonic acids of Formula II are obtained by reducing 2-methyl-4-chlorobenzene-1-sulfonic acid chloride with sodium sulfite to form 2-methyl-4-chlorobenzene-1-sulfinic acid; reacting the latter by alkylation or the like, e.g. with dialkyl sulfate to form the corresponding 1-alkyl-sulfonyl-2-methyl-4-chloro-benzene; nitrating this substance with a mixture of nitric acid/sulfuric acid to form 1-alkyl-sulfonyl-2-methyl-4-chloro-5-nitrobenzene (Formula V) and reacting this intermediate with aqueous sodium sulfite to form a 2-nitro-4-alkyl-sulfonyl-5-methylbenzene-1-sulfonic acid of Formula VI; oxidizing the sodium salt thereof with aqueous sodium hypochlorite to form the corresponding 4,4′ - dinitro-6,6′-di-alkyl-sulfonyl-stilbene-3,3′-disulfonic acid of Formula I; and reducing the nitro groups to amino groups in a known manner, thus obtaining the corresponding 4,4′-diamino analogs of Formula II.

While starting materials of Formula V in which X represents alkyl, are obtained from 1-alkylsulfonyl-2-methyl-4-chloro-benzene by nitration as mentioned above, starting materials in which X represents lower alkoxy-alkyl are obtained in an analogous manner, alkoxy-alkylating the above-mentioned sulfinic acid in lieu of alkylating the same.

Starting materials of Formula IV in which X represents a dialkylamino radical are obtained from 2-methyl-4-chloro-benzene-1-sulfonic acid by nitration to 2-methyl-4-chloro-5-nitro-benzene-1-sulfonic acid, chlorination with chlorosulfonic acid to 1-chlorosulfonyl-2-methyl-4-chloro-5-nitro-benzene, and reaction of the latter with dialkylamine.

Starting materials in which X represents an unsubstituted or substituted benzyl or phenylethyl radical are obtained by reducing the above mentioned 1-chlorosulfonyl-2-methyl-4-chloro-5-nitro-benzene with sodium sulfite to the corresponding sulfinic acid and simultaneously or successively exchanging the chlorine atom in 4-position by the —SO₃H group, consuming a second mol of sodium sulfite, and reacting this intermediate with an unsubstituted or substituted benzyl- or phenylethylchloride.

By using for acylation of the compounds of Formula II mixtures of compounds of the formulas

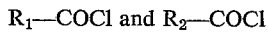
R₁—COCl and R₂—COCl there are obtained final mixed brightener products with different substituents R₁ and R₂ in ratios which depend largely on the ratio in which the aforesaid chlorides have been added. These mixtures are used as brightening agents without separation of the individual compounds therefrom, since such separation into individual components would be without any commercial interest.

The novel intermediates of Formula III in which m and/or n=1 are obtained from the novel 4,4'-diaminostilbene-3,3'-disulfonic acids of Formula II by reaction with p-nitrobenzene carboxylic acid halides and reduction of the nitro groups to amino groups.

Reactive derivatives of organic carboxylic acids of the formula

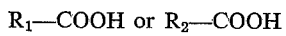
R₁—COOH or R₂—COOH mainly anhydrides, chlorides or bromides of these acids, (sometimes also ketenes), and also organic half esters of carbonic acid of the formula

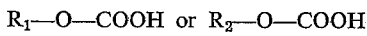
R₁—O—COOH or R₂—O—COOH in the latter case mainly the chloroformic or bromoformic acid esters of lower alkanols, are used as acylating agents.

In the acylation steps of the above diagram, chlorides and bromides of aromatic carboxylic acids, in particular benzoic acid chlorides or bromides the ring of which is substituted by lower alkoxy groups and/or lower alkyl groups particularly in one of the ortho- and/or the para-position, are preferred examples of such aromatic carboxylic acid chlorides and bromides are 4-methoxy- or 4-ethoxy-benzoyl chloride or bromide, 3-methyl-4-methoxy, 2,4-dimethoxybenzoyl chloride or bromide, 2-methoxy-4-methyl- or 2-ethoxy-4-methyl-benzoyl chloride or bromide, 2-methoxy-4-ethyl- or 2-ethoxy-4-ethyl-benzoyl chloride or bromide, 2-methoxy-4,5-dimethyl- or 2-ethoxy-4,5-dimethyl-benzoyl chloride or bromide, or 3,4,5-trimethoxybenzoyl chloride or bromide.

The diaminostilbene compounds of Formula II or IV are advantageously acylated in the presence of tertiary organic nitrogen bases, optionally in the presence of inert organic solvents and, preferably, in the absence of water, at a temperature of about 20–120° C., in particular between 80 and 100° C. Suitable tertiary nitrogen bases are, mainly, pyridine and its homologues, tri-lower alkylamines, triethylenediamine and di-lower alkyl anilines; examples of inert organic solvents are optionally halogenated or nitrated aromatic hydrocarbons.

The following examples illustrate the invention. Where not otherwise stated, parts and percentages are given by weight. The temperatures are in degrees centigrade. The relationship of parts by weight to parts by volume is as that of kilograms to liters. Where not otherwise stated, solutions are aqueous.

EXAMPLE 1

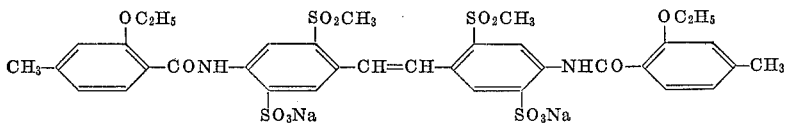

40 parts of 4,4'-diamino-6,6'-dimethylsulfonylstilbene-3,3'-disulfonic acid [intermeriate (a)] are suspended in 400 parts by volume of anhydrous pyridine and a solution of 40 parts of 2-ethoxy-4-methylbenzoyl chloride in 50 parts of anhydrous toluene is added while stirring. The mixture obtained is then refluxed for 2 hours at 100–110°. At the end of this time, another solution of 40 parts of 2-ethoxy-4-mehylbenzoyl chloride in 50 parts of anhydrous toluene is added dropwise and the mixture is heated for another 2 hours at 100–110°.

By the end of this time, no more free aromatic amino groups can be traced. The dark colored reaction solution is then allowed to cool.

The reaction product separates out as a yellowish mass which becomes solid when cold. The crude product is purified by first washing with benzene, drying for a short time, suspending it in 1200 parts by volume of 5% sodium carbonate solution, heating the suspension at 70–80° while stirring, again cooling, filtering off the yellowish product of the above formula, washing with 2.5 sodium chloride solution and drying at 80° in vacuo. In this way, a pale yellow water-soluble powder is obtained the diluted aqueous solution of which has a blue fluorescence in daylight. If uncolored cellulose fibers are treated with aqueous solutions of the product, then a beautiful, neutral white effect is obtained on the strata mentioned. The product has remarkable stability to agents giving off chlorine which enables both optical and chemical bleaching to be performed in one bath. Another advantage of the product is that it has the property to draw onto cellulose fibers also in the presence of non-ionogenic washing agents.

The 4,4' - diamino-6,6'-dimethylsulfonyl-stilbene-3,3'-disulfonic acid of the formula

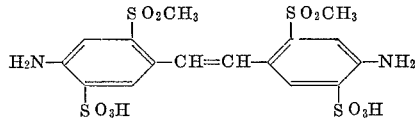

used in the above example is obtained in the following manner:

120 parts of sodium sulfite are dissolved in 480 parts of water. To this solution there are added at a temperature of 65 to 70° within 20 minutes, while stirring well, 142 parts of 2-methyl-4-chlorobenzene-1-sulfonic acid chloride and a solution of 47 parts of sodium hydroxide in 110 parts of water. The addition of the sodium hydroxide solution has to be performed at such a rate, that the pH value of the mixture remains at 8 to 9.

After an additional stirring for 30 minutes at the same temperature and pH, the reaction solution is clarified and the sodium salt of the 2-methyl-4-chlorobenzene-1-sulfinic acid is salted out with 15% of solid sodium chloride (calculated on the total weight of the reaction mixture). 106 parts of the sodium salt of the aforesaid sulfinic acid precipitate upon cooling in the form of white, easily water-soluble crystals which are separated by filtration. The free sulfinic acid is obtained from a concentrated aqueous solution of the sodium salt by addition of an excess of hydrochloric acid, and has a melting point of 91°.

106 parts of the sodium salt of the above mentioned sulfinic acid are dispersed in 130 parts of water and heated up to 70–75°. At this temperature, 160 parts of dimethyl sulfate are added within 45 minutes while the pH value of the mixture is adjusted to 8 to 8.5 by simultaneous addition of a sufficient amount of aqueous sodium hydroxide solution. After the addition of dimethyl sulfate, 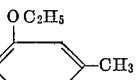 the reaction mixture is stirred at the same temperature and pH for an additional hour. After cooling to 10°, the reaction product is filtered off with suction and washed with water. 2-methyl-4-chloro-benzene-1-methyl sulfone, which is thus obtained in a yield of about 80%, forms colorless crystals and melts at 70°.

51.1 parts of 2-methyl-4-chlorobenzene-1-methyl sulfone are dissolved at 25° in 250 parts of concentrated sulfuric acid. To this solution there are added dropwise at a temperature of 1° to 10° within 1 to 2 hours, while stiring well, a mixture consisting of 17 parts of nitric acid (100% $HNO_3$) and 17 parts of concentrated sulfuric acid. The whole batch is then stirred at 0° to 10° for a further 3 hours. In order to isolate the formed nitro compound, the reaction mixture is poured on to 600 parts of crushed ice, the nearly white precipitate is filtered off and washed well with water. The product is dried at 75° under reduce pressure to yield 62 parts (99% of the theoretical amount) of crude 2-methyl-4-chloro-5-nitrobenzene-1-methyl sulfone. This product melts at 127–130°. The pure product (M.P. 137°) is obtained in a yield of about 85% by recrystallization from ethanol, 10 parts of ethanol for every part of crude 2-methyl-4-chloro-5-nitrobenzene-1-methyl sulfone being required.

50 parts of 2-methyl-4-chloro-5-nitrobenzene-1-methyl sulfone are dispersed in a mixture of 60 parts of ethanol and 140 parts of water. To the well stirred mixture there is added at 80 to 82° within about 30 minutes a freshly prepared solution of 25.2 parts of sodium sulfite in 100 parts of water. During the addition of the sulfite solution, the pH is maintained in the range of 7.5 to 9 by addition of a few drops of diluted hydrochloric acid. To complete the reaction, the mixture is stirred at the same temperature for an additional 10 minutes. Thereafter, 32 parts of solid sodium chloride are added and the reaction mixture is cooled down to 10°. A thick slurry is formed which is filtered off by suction and the obtained crude product is purified in the following manner: The wet filter cake is dissolved in 250 parts of hot water, cooled down to 25 to 35°, clarified by filtration, the filtrate is then salted out at 60 to 70° with 55 parts of solid sodium chloride and cooled to 10°. Thereby, the sodium salt of the 2-nitro-4-methylsulfonyl-5-methylbenzene-1-sulfonic acid is obtained in nearly colorless crystals. The product is filtered off and dried at 80° under reduced pressure. This intermediate is obtained in a yield of 75%.

52.5 parts of the sodium salt of 2-nitro-4-methylsulfonyl-5-methylbenzene-1-sulfonic acid are dissolved in 900 parts of water. After raising the temperature to 30°, a solution of 28 parts of sodium hydroxide in 65 parts of water is poured in, then a solution of sodium hypochlorite and sodium hydroxide, prepared from 100 parts by volume of a sodium hypochlorite solution containing 17 parts of active chlorine and 4 parts of sodium hydroxide, is added dropwise within 25 to 30 minutes. A slightly exothermic reaction takes place and the temperature remains without external heating at 30 to 35°. The di-sodium salt of 4,4'-dinitro-6,6'-dimethylsulfonyl-stilbene-3,3'-disulfonic acid separates in glittering, yellow needles from the dark brown solution. After the addition of the above sodium hypochlorite solution, the reaction mixture is stirred for 1 hour at 35°. The separation of the new stilbene derivative is completed by the addition of 25 parts sodium chloride, and the whole is cooled down to 15 to 20°, the product filtered off, washed with aqueous 5%-sodium chloride solution and dried at 80° under vacuum. The yield is 32.5 parts of di-sodium salt, corresponding to 30.2 parts of the free acid (62% of the theoretical amount).

20 parts of cast iron powder are suspended in 500 parts of water, 2 parts of acetic acid are added and the whole is heated for 30 minutes at 80 to 90° while stirring well. 19.2 parts of the di-sodium salt of 4,4'-dinitro-6,6'-dimethylsulfonyl-stilbene-3,3'-disulfonic acid are added to the iron suspension at 90 to 95° within a time of 20 minutes. The reaction mixture is then stirred for 1 hour at the boil. Thereafter, an aqueous solution of 2.4 parts of sodium carbonate is added and then the iron residue is filtered off hot and is washed with hot water until the filtrate gives no more diazo reaction. The yellowish solution is acidified with 15 parts by volume of 30%-hydrochloric acid, whereby 4,4'-diamino-6,6'-dimethylsulfonyl-stilbene-3,3'-disulfonic acid separates as a slightly cream colored precipitate. This intermediate product is filtered off, washed with water and dried at 80° under reduced pressure.

Products having a similar effect are obtained by replacing the 40 parts of 4,4'-diamino-6,6'-dimethyl-sulfonyl-stilbene-3,3'-disulfonic acid by an equimolar amount of one of the 4,4'-diamino-stilbene-3,3'-disulfonic acids [intermediates (a) to (s)] which bear in 6- and 6'-position the following substituents:

(b) Amylsulfonyl
(c) β-Methoxy-ethyl-sulfonyl
(d) β-Ethoxy-ethyl-sulfonyl
(e) γ-Methoxy-propyl-sulfonyl
(f) β-Methoxy-propyl-sulfonyl
(g) Benzyl sulfonyl
(h) β-Phenyl-ethyl-sulfonyl
(i) 3,4-di-chloro-benzyl-sulfonyl
(j) 4-bromo-benzyl-sulfonyl
(k) 2,4-dimethyl-benzyl-sulfonyl
(l) 4-methoxy-benzyl-sulfonyl
(m) Dimethylamino-sulfonyl
(n) Diethylamino-sulfonyl
(o) Pyrrolidino-sulfonyl
(p) Piperidino-sulfonyl
(q) Morpholino-sulfonyl
(r) 2,6-dimethylmorpholino-sulfonyl
(s) Hexamethylene-imino-sulfonyl.

and following otherwise the procedure given in the example. The intermediate products (b) to (l) inclusive are produced in the same manner as described in Example 1 for intermediate (a) using the corresponding 2-methyl-4-chlorophenyl-5-nitro-1-alkylsulfones as starting materials.

The compounds (m) to (s) inclusive are produced as described in Example 3 infra, for the case of 4,4'-diamino-6,6'-dimethylaminosulfonyl-stilbene - 3,3' - disulfonic acid.

EXAMPLE 2

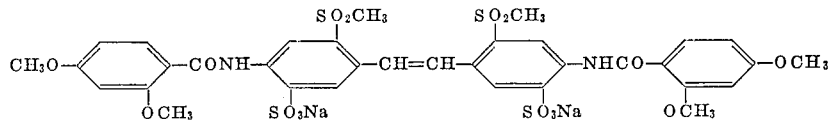

52.6 parts of 4,4'-diamino - 6,6' - dimethylsulphonyl-stilbene-3,3'-disulphonic acid in 2000 parts by volume of anhydrous toluene are heated to 65–70° and, at this temperature while stirring, first 100 parts by volume of anhydrous pyridine and then, within 15 minutes, a solution of 60 parts of 2,4-dimethoxybenzoyl chloride in 300 parts of anhydrous toluene are added. The yellowish suspension obtained is stirred for 1 hour at 100–110°. At the end of this time, another portion of 25 parts of 2,4-dimethoxybenzoyl chloride in 75 parts by volume of anhydrous toluene is added and the whole is stirred for 2 hours at 100–110°. After cooling, the yellowish precipitate is filtered off, the product is suspended in 2000 parts by volume of water and, at 50–60° while stirring, 15% sodium carbonate solution is added until the pH of the mixture remains at 8.5–9. Any toluene and pyridine remaining is removed with steam, the aqueous suspension is cooled to 20° and the pale yellowish reaction product of the above formula which separates out is filtered off. After washing with 2.5% sodium chloride solution, the product is dried at 80° in vacuo. A pale yellowish powder is obtained, the diluted aqueous solution of which has a blue fluorescence in daylight.

This product can be used for the brightening of cellulose fibers. Cotton fabric can be chemically and optically bleached in one step by the combined use of brightener and sodium hypochlorite. Also, in a non-ionogenic washing liquor with and without bleachers giving off chlorine, the product gives beautiful, neutral white effects.

EXAMPLE 3

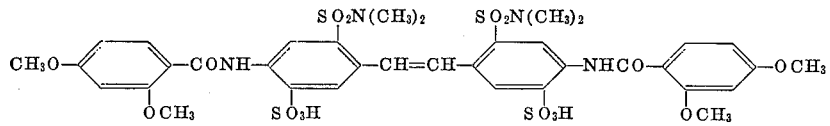

When in Example 2 the 52.6 parts of 4,4'-diamino-6,6'-di-methylsulfonyl-stilbene-3,3'-disulfonic acid are replaced by 58.8 parts of 4,4'-diamino-6,6'-bis-dimethyl-sulfamido-stilbene-disulfonic acid, the di-sodium salt of the above mentioned acid is obtained which has, in spite of its good solubility in water, similar brightening properties as the corresponding di-methylsulfonyl compound. This product is isolated from its aqueous solution by salting out with 15% of solid sodium chloride (calculated on the total weight of the solution). The purified product forms a slightly yellowish powder, the aqueous solution of which exhibits in daylight a pronounced bluish fluorescence.

The 4,4'-diamino-6,6'-bis-dimethylsulfamido - stilbene-3,3'-disulfonic acid in the above example is obtained in the following manner:

94.5 parts of the sodium salt of 2-methyl-4-chloro-5-nitro-benzene-1-sulfonic acid are added while stirring well to 480 parts of chlorosulfonic acid at 15 to 20°. The whole mixture is subsequently stirred at 75° for a further two hours. In order to isolate the formed 2-methyl-4-chloro-5-nitrobenzene-1-sulfonic acid chloride, the solution is poured onto 1400 parts of crushed ice, the grayish precipitate is filtered off, washed well with water and dried at 60° in vacuum. The sulfochloride melts at 114–116° and crystallizes from acetone in nearly white needles.

A solution of 82 parts of this sulfochloride in 400 parts of acetone is poured, while stirring, onto 600 parts of crushed ice. To this suspension of 2-methyl-4-chloro-5-nitrobenzene-1-sulfonic acid is added a solution of 35 parts of dimethylamine in 50 parts of water. During the addition the temperature is kept down to −4 to 2°. The yellowish slurry is then filtered off and the 2-methyl-4-chloro-5-nitrobenzene - 1 - sulfodimethylamide washed with water. The new product melts at 128°.

To obtain the sodium salt of 2-nitro-4-dimethyl-sulfamido-5-methylbenzene-1-sulfonic acid and 2-methyl-4-chloro-5-nitrobenzene-1 - sulfodimethylamide is reacted with sodium sulfite in a mixture of ethanol and water, in the manner as described in Example 1 for the production of the di-sodium salt of the corresponding methylsulfonyl compound. This product forms only faintly coloured, water soluble crystals.

35 parts of sodium hydroxide and 0.1 part of sodium laurate are dissolved in 100 parts of water, after the addition of a solution of 0.1 part of manganese sulfate in 20 parts of water, there are added at a temperature of 33° 24 parts of the above described sodium salt in 500 parts of water within 10 hours while blowing into the reaction mixture a strong stream of oxygen. The brown solution is then clarified and the well water-soluble 4,4'-dinitro-6,6'-bis-dimethyl-sulfamido - stilbene - disulfonic acid in form of its brownish disodium salt salted out of saturation with sodium chloride.

The reduction of this dinitro-compound into the required diamino-product is carried out in the same manner as described in Example 1 for the production of the corresponding dimethylsulfonyl compound.

Products of similar good properties are obtained by repeating Example 3, but replacing in the same the acylating agent (used in Example 2) by the acylating agent used in Example 1 and/or by replacing in Example 3 the 35 parts of dimethylamine by an equimolar amount of one of the amines listed in Table III below, whereby intermediates (m) to (s) inclusive listed following Example 1 and others are obtained.

TABLE III
(a) Diethylamine
(b) Pyrrolidine
(c) Piperidine
(d) Morpholine
(e) 2,6-dimethyl morpholine
(f) Hexamethylene imine
(g) N-methyl-N-ethyl amine
(h) Di-(β-methoxy-ethyl) amine
(i) Di-propyl amine

EXAMPLE 4

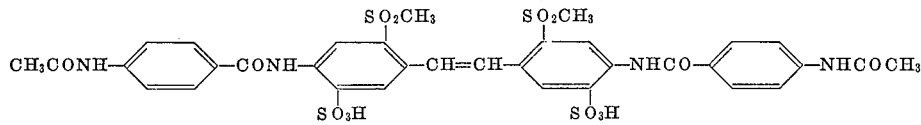

(i) 38.5 parts of 4,4' - diamino-6,6'-dimethylsulphonyl-stilbene - 3,3'-disulphonic acid are suspended in 500 parts by volume of pyridine and 40 parts of pulverised 4-nitrobenzoyl chloride are added to the suspension while stirring at room temperature. The temperature spontaneously rises to 50–60° and the reaction mixture thickness into a stiff yellow paste. The mixture is then heated to 110° within 30 minutes and, after it can no longer be stirred, it is cooled to 30°. After the addition of 700 parts by volume of abs. toluene the mixture can again be stirred and it is heated to 110–115° while stirring and then refluxed for 30 minutes at this temperature while stirring. The yellow slurry obtained is cooled to 30°, filtered under suction and the residue is washed with benzene. The yellow filter cake is then suspended in 2000 parts of water, sodium carbonate is added at 70–80° while stirring until phenolphthalein paper remains red, any benzene and pyridine present being removed by bubbling steam through and, after cooling, the yellow reaction product of the formula

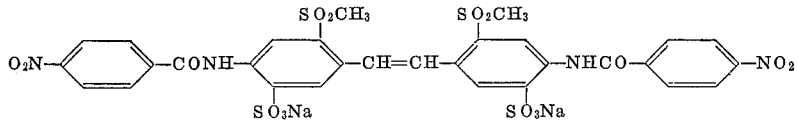

is filtered off and washed with 2.5% sodium chloride solution.

(ii) 200 parts of cast iron powder are suspended in 6000 parts of water, 40 parts by volume of acetic acid are added and the whole is heated for 30 minutes at 80–90° while stirring. The damp yellow filter cake of the dinitro compound mentioned above is added to the iron suspension at 90–95° and within 30 minutes and the reaction mixture is then stirred for 3 hours at the boil. After this time, 15% sodium carbonate solution is added until the pH of the mixture is 8–9 and then the iron residue is filtered off hot and is washed with hot water until the filtrate has, for practical purposes, no more diazo reaction. A yellow solution is obtained which contains the N,N'-bis-(p-aminobenzoyl) compound of the sodium salt of 4,4'-diamino-6,6'-dimethylsulphonyl-stilbene-3,3'-disulphonic acid.

(iii) Acetic acid anhydride is added dropwise to the amine solution obtained while stirring at 80–85° until a sample shows no diazo reaction. After neutralising with aqueous sodium hydroxide solution, the disodium salt of the N,N'-bis-(p-acetylaminobenzoyl) derivative formed is obtained as a whitish precipitate which can be filtered after addition of the same volume of 25% sodium chloride solution. After cooling, it is filtered off under suction, washed with 2% sodium chloride solution and dried in vacuo at 70–80°. A yellowish powder is obtained which dissolves in hot water and which can also be used for the optical brightening of cellulose fibres.

By using, instead of acetic acid anhydride, chloroacetic acid anhydride, β - bromopropionic acid anhydride or 4-methylphenoxy acetic acid anhydride and otherwise following the procedure given in Example 4, the corresponding bis-(chloro-acetylamino), and bis-(β-bromopropionylamino) or bis-(4-methyl-phenoxyacetylamino) compound, respectively, are obtained which have the same effect.

To produce the urethane derivative:

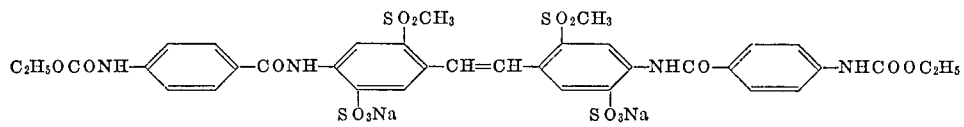

which is an equally effective brightener, chloroformic acid ethyl ester is added dropwise at 75–80° while stirring to the solution of the sodium salt of 4,4'-bis-(p-aminobenzoylamino) - 6,6'-dimethylsulphonyl-stilbene-3,3'disulphonic acid and the acid liberated is neutralized with sodium carbonate solution. When no more diazotizable amino groups can be traced, the reaction product is precipitated in a form which can be filtered by the addition of sodium chloride.

Both the diacetyl derivative as well as the urethane derivative are considerably more stable to sodium hypochlorite than the corresponding derivatives of 4,4' - bis-(p-aminobenzoylamino)-stilbene-6,6'-disulphonic acid.

Products of similar good brightening properties, and especially of good fastness to chlorine are obtained by repeating Example 4, and using 4,4'-diamino-6,6'-dimethylsulfonyl stilbene-3,3'-disulfonic acid or one of the other starting acids listed following Example 1 under (b) to (s) inclusive, or 4,4' - diamino - 6,6'-bis-dimethylsulfamido-stilbene-3,3'-disulfonic acid used in Example 3.

EXAMPLE 6

5 g. of sodium 4,4' - dinitro-6,6'-dimethylsulfonyl-stilbene - 3,3'-disulfonate dissolved in 100 ml. of water is emulsified with 200 g. of a petroleum fraction boiling within the range of 205 to 345° (400 to 650° F.), with application of ultrasound.

Wooden poles are impregnated with the resulting mixture in a closed charging tank in which the impregnation liquid was held at a temperature of about 165° C. under pressure.

EXAMPLE 7

Wooden poles can be protected by the method described in U.S. Patent 2,965,516 granted to Clarence E. Wilkinson on Dec. 20, 1960 but replacing in the treatment of the wooden structure to be protected the copper-8-quinolinolate by a similar amount of sodium 4,4'-dinitro-6,6'-(di-methylsulfonyl)-stilbene - 3,3' - disulfonate dissolved in water.

In a similar manner pentachlorophenol can be replaced partially or entirely by a corresponding amount of an aqueous solution of sodium 4,4'-dinitro-6,6'-(di-methylsulfonyl)-stilbene-3,3'-disulfonate in the examples of U.S. Patent 2,955,945 issued to Robert E. Emond on Oct. 11, 1960.

EXAMPLE 8

A chromatoplate is made as follows: a 20 x 20 cm. glass plate is covered by means of a Stahl spreading device, with a 300 micron-thick layer of cellulose powder, prepared by suspending 7.5 g. of the latter in 45 ml. of methanol, the suspension having been shaken for 5 minutes.

The plate is then dried for 10 minutes at 105° C. A mixture of organic amines and metabolites thereof to be determined, is applied and the individual constituents of the mixture spotted in 0.2 to 1 microgram amounts, 1.5 cm. from the bottom edge of the plate. The plate is run by ascending chromatography in a closed glass vessel which is saturated with solvent, n-butanol saturated with 3 N HCl being used.

The solvent is allowed to rise 15 cm. which point is reached in about 3 hours at 20° C.

After development, the plate is dried with warm air and the substances separated are detected by spraying with a solution of 1 g. of sodium 4,4'-diamino-6,6'-dimethylsulfonyl-stilbene-3,3'-disulfonate in 100 ml. of water, and the sprayed plate is dried for 25 minutes at 55° C.

The spots are then located under UV-light, and identified by comparison with standard samples.

EXAMPLE 9

Full thickness pieces of liver tissue are fixed in buffered Formalin and/or other conventional fluids. They are then dehydrated through ethanol, a cryostat section at 5.0μ is made therefrom and brought to water.

The section is then immersed in an incubating medium consisting of a solution of 1 g. of sodium 4,4'-diamino-6,6'-dimethylsulfonyl-stilbene-3,3'-disulfonate in 100 ml. of water, and is incubated therein for 2 to 3 hours at 37° C., washed in running water for 5 to 10 minutes, counterstained with methyl green and mounted in glycerol jelly. It is ready for observation in a fluorescence microscope.

I claim:
1. A compound of the formula

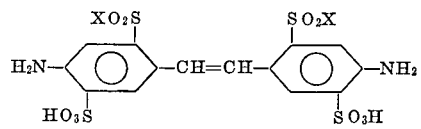

wherein:
X represents a member selected from the group consisting of
  alkyl of from 1 to 5 carbon atoms;
  lower alkoxy-alkyl wherein the alkyl moiety has from 2 to 3 carbon atoms;
  alkyl of from 1 to 2 carbon atoms substituted by phenyl, chlorophenyl, bromophenyl, lower alkylphenyl and lower alkoxyphenyl;
  di-lower alkyl-amino, pyrrolidino, piperidino, morpholino, lower alkyl-morpholino and hexamethylene imino.

2. A compound as defined in claim 1, namely, the compound of the formula

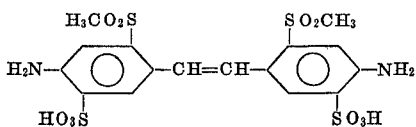

3. A process which comprises
(1) reacting a compound of the formula

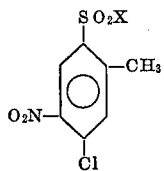

with sodium sulfite to form a compound of the formula

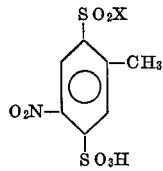

and (2) subjecting the thus formed compound from step (1) to oxidation to form a compound of the formula

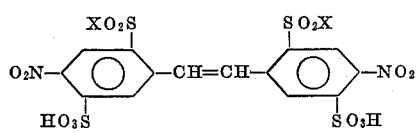

wherein

X represents a member selected from the group consisting of
  alkyl of from 1 to 5 carbon atoms;
  lower alkoxy-alkyl wherein the alkyl moiety has from 2 to 3 carbon atoms;
  alkyl of from 1 to 2 carbon atoms substituted by phenyl, chlorophenyl, bromophenyl, lower alkyl-phenyl and lower alkoxyphenyl;
  di-lower alkyl-amino, pyrrolidino, piperidino, morpholino, lower alkyl-morpholino and hexamethylene imino.

4. A method as defined in claim 3, wherein X is lower alkyl and the oxidation reactant in step (2) is aqueous sodium hypochlorite.

5. A compound of the formula

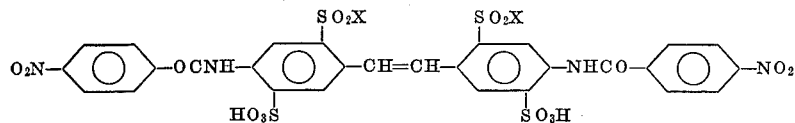

wherein

X represents a member selected from the group consisting of
  alkyl of from 1 to 5 carbon atoms;
  lower alkoxy-alkyl wherein the alkyl moiety has from 2 to 3 carbon atoms;
  alkyl of from 1 to 2 carbon atoms substituted by phenyl, chlorophenyl, bromophenyl, lower alkyl-phenyl and lower alkoxyphenyl;
  di-lower alkyl-amino, pyrrolidino, piperidino, morpholino, lower alkyl-morpholino and hexamethylene imino.

6. A compound of the formula

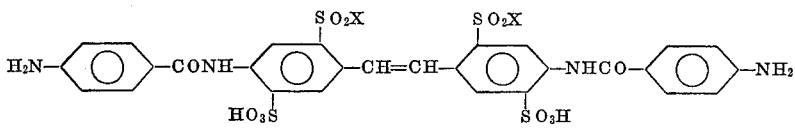

wherein

X represents a member selected from the group consisting of
  alkyl of from 1 to 5 carbon atoms;
  lower alkoxy-alkyl wherein the alkyl moiety has from 2 to 3 carbon atoms;
  alkyl of from 1 to 2 carbon atoms substituted by phenyl, chlorophenyl, bromophenyl, lower alkyl-phenyl and lower alkoxyphenyl;
  di-lower alkyl-amino, pyrrolidino, piperidino, morpholino, lower alkyl-morpholino and hexamethylene imino.

7. A compound of the formula

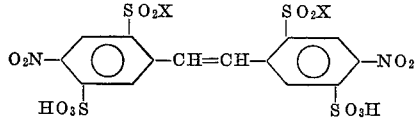

wherein

X represents a member selected from the group consisting of
  alkyl of from 1 to 5 carbon atoms;
  lower alkoxy-alkyl wherein the alkyl moiety has from 2 to 3 carbon atoms;
  alkyl of from 1 to 2 carbon atoms substituted by phenyl, chlorophenyl, bromophenyl, lower alkylphenyl and lower alkoxyphenyl;
  di-lower alkyl-amino, pyrrolidino, piperidino, morpholino, lower alkyl-morpholino and hexamethylene imino.

8. A compound as defined in claim 7 wherein X represents methyl.

(References on following page)

References Cited

UNITED STATES PATENTS 3,260,715  7/1966  Saunders _____ 260—240
2,690,453  9/1954  Savidge et al. _____ 260—507

HENRY R. JILES, Primary Examiner
G. T. TODD, Assistant Examiner

U.S. Cl. X.R.

8—6.5; 106—176; 117—33.5; 252—301.2; 260—505, 507, 509, 510